United States Patent [19]
Nachenberg

[11] Patent Number: 6,067,410
[45] Date of Patent: *May 23, 2000

[54] EMULATION REPAIR SYSTEM

[75] Inventor: Carey Nachenberg, Northridge, Calif.

[73] Assignee: Symantec Corporation, Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/605,285

[22] Filed: Feb. 9, 1996

[51] Int. Cl.⁷ .................................................. G06F 15/20

[52] U.S. Cl. ..................................... 395/500.49; 713/200

[58] Field of Search ................................... 364/580, 550, 364/578; 380/4; 395/186, 187.01, 500, 527

[56] References Cited

U.S. PATENT DOCUMENTS

| | | | |
|---|---|---|---|
| 4,975,950 | 12/1990 | Lentz ........................................... | 380/4 |
| 5,121,345 | 6/1992 | Lentz ........................................... | 364/550 |
| 5,144,660 | 9/1992 | Rose ............................................. | 380/4 |
| 5,319,776 | 6/1994 | Hile et al. ................................... | 395/575 |
| 5,321,840 | 6/1994 | Ahlin et al. ................................. | 395/700 |
| 5,349,655 | 9/1994 | Mann ............................................ | 395/575 |
| 5,359,659 | 10/1994 | Rosenthal .................................... | 380/4 |
| 5,398,196 | 3/1995 | Chambers ................................... | 364/580 |
| 5,408,642 | 4/1995 | Mann ............................................ | 395/575 |
| 5,421,006 | 5/1995 | Jablon et al. ............................... | 395/575 |
| 5,440,723 | 8/1995 | Arnold et al. .............................. | 395/181 |
| 5,442,699 | 8/1995 | Arnold et al. .............................. | 380/4 |
| 5,485,575 | 1/1996 | Chess et al. ................................ | 395/183.14 |
| 5,559,960 | 9/1996 | Lettvin ........................................ | 395/186 |
| 5,613,002 | 3/1997 | Kephart et al. ............................. | 380/4 |
| 5,623,600 | 4/1997 | Ji et al. ....................................... | 395/187.01 |

FOREIGN PATENT DOCUMENTS

| | | |
|---|---|---|
| 0 636 977 A2 | 2/1995 | European Pat. Off. . |
| 0636977 A2 | 2/1995 | European Pat. Off. ........ G06F 11/00 |
| 95/33237 | 12/1995 | WIPO . |

OTHER PUBLICATIONS

"Automated Program Analysis for Computer Virus Detection", *IBM Technical Disclosure Bulletin*, vol. 34, No. 2, Jul. 1991, pp. 415–416.

"Artificial Immunity for Personal Computers", *IBM Technical Disclosure Bulletin*, vol. 34, No. 2, Jul. 1991, pp. 150–154.

Marshall, G., "Pest Control", *LAN Magazine*, Jun. 1995, pp. 54–67.

(List continued on next page.)

*Primary Examiner*—Kevin J. Teska
*Assistant Examiner*—Thuan Do
*Attorney, Agent, or Firm*—Fenwick & West LLP

[57] ABSTRACT

An emulation repair system (200) restores virus-infected computer files (220) to their uninfected states without risk of infecting the rest of the computer system (202), by providing a virtual machine (216) for emulating the virus-infected computer file (220), a foundation module (240) including generic, machine language repair routines (242), and a virus specific overlay module (262). Emulation repair system (200) receives the identity of the infected computer file (220) and the infecting virus (224) from a virus scanning module, and uses the received information to access a virus definition (232) that includes decryption information on the identified virus (224). The infected computer file (220) is emulated in the virtual machine (216) until it is determined from comparison with the decryption information that the virus (224) is fully decrypted. The foundation and overlay modules (240, 262) are then loaded into the virtual machine (216) and control of the virtual machine (216) is given to the overlay module (262). The overlay module (262) calls repair routines in the foundation module (240), the overlay module (262), and the virus itself (224), as necessary, to restore over-written host bytes (228) from the infected host file (220) to their proper locations in the infected host file (220). Repairs made to the image (220") of the host file (220) in the virtual machine (216) are reflected to a back-up file (220') in the computer system (202).

22 Claims, 8 Drawing Sheets

OTHER PUBLICATIONS

Digitext, "Dr. Solomon's Anti–Virus Toolkit for Windows and DOS", *S&S International PLC*, Jan. 1995, pp. 1–15, 47–65, 75–77, 91–95, 113–115, and 123–142, United Kingdom.

Veldman, Frans, "Virus Writing Is High–Tech Infosecurity Warfare", *Security on the I–Way '95*, 1995, pp. L–1–L–16, U.S.A.

Symantec Corporation, "Norton AntiVirus for Windows 95 & Special Subscription Offer", 1995, U.S.A.

"ThunderBYTE Anti–Virus Utilities User Manual", ThunderBYTE B.V., 1995, pp. i–191, Wijchen, The Netherlands.

"Virus Infection Techniques: Part 3", *Virus Bulletin*, Jan. 1995, pp. 006–007, Oxfordshire, England.

"UK—Sophos Intros Unix Virus Detection Software Jan. 26, 1995", *Newsbytes News Network*, Jan. 26, 1995, U.S.A.

Cohen, Frederick B., "A Short Course on Computer Viruses", *John Wiley & Sons, Inc.*, Second Edition, pp. 54–55, 199–209, 1994, U.S.A.

Veldman, Frans, "Heuristic Anti–Virus Technology", *Proceedings of the International Virus Protection and Information Security Council*, Apr. 1, 1994.

Karney, James, "Changing the Rules on Viruses; Trend Micro Devices Inc.'s PC Rx 4.0 virus Detection Software", *PC Magazine*, Aug., 1994, vol. 13, No. 14; p. NE36, U.S.A.

Wells, Joseph, "Viruses in the Wild", Proceedings of the International Virus Protection and Information Security Council, Apr. 1, 1994.

Gordon, Scott, "Viruses & Netware", Proceedings of the International Virus Protection and Information Security Council, Mar. 31, 1994.

Solomon, Alan, "Viruses & Polymorphism", Proceedings of the International Virus Protection and Information Security Council, Mar. 31, 1994.

Case, Tori, "Viruses: An Executive Brief", Proceedings of the International Virus Protection and Information Security Council, Mar. 31, 1994.

Gotlieb, Leo, "End users and responsible computing: Information Management", *CMA—the Management Accounting Magazine*, Sep., 1993, vol. 67, No. 7, p. 13, U.S.A.

"Network Management; LAN Buyers Guide: Network Management; Buyers Guide", *LAN Magazine*, Aug., 1992, vol. 7; No. 8, p. 188, U.S.A.

"Anti–virus Company Claims Polymorphic Breakthrough Jul. 10, 1992", *Newsbytes News Network*, Jul. 10, 1992, U.S.A.

Schnaidt, Patricia, "Security; data security issues; Lesson 44; Tutorial", *LAN Magazine*, Mar., 1992, U.S.A.

Skulason, Fridrik, "For Programmers", *Virus Bulletin*, Jul. 1990, pp. 10–11, Oxon, England.

EMULATION REPAIR SYSTEM

CROSS-REFERENCE TO RELATED APPLICATIONS

This patent application is related to co-pending patent application Ser. No. 08/535,340, filed Sep. 28, 1995 and entitled "Polymorphic Virus Detection Module", which patent application is assigned to the same assignee as herein, and is hereby incorporated by reference in its entirety.

BACKGROUND OF THE INVENTION

1. Field of the Invention

This invention relates to systems and methods for repairing files that have been infected with computer viruses, and more particularly to systems and methods that repair infected files using a combination of generic and virus-specific repair routines.

2. Background Art

The infection of various boot objects and executable files with software viruses is a well known and growing problem. A major objective of anti-virus efforts is the detection of infected files, and a number of different systems, including the above-referenced Polymorphic Virus Detection Module, have been developed for this purpose. Virus detection limits the scope of damage to uninfected parts of the system but it is only one of the objects of anti-virus programmers. Another objective is to repair those files already infected with the detected virus (host files). This requires excising the viral code from the stored version of the host file and restoring to the host file any code that may have been modified by the virus.

Most computer viruses employ one of several well-known methods to infect host files and boot objects. Typically, the virus appends or prepends itself to the host file and replaces commands at the entry point of the host file (host bytes) with viral code that passes control of the processor to the virus when the host file is executed. Another group of viruses simply overwrite critical code (host bytes) at the host file entry point. In almost all cases, the virus saves the host bytes that it overwrites so the host bytes can be restored to the host file image in memory following execution of the viral code. Control of the processor is then returned to the host file image in memory, allowing it to execute normally. Without this last step, the processor would likely crash, calling attention to the fact that there may be some problem with the host file. Such early detection would severely limit the damage a virus could inflict on a computer system. Consequently, virus designers invest much effort in hiding the presence of their viruses.

For host files infected by standard strategies, repair can often be accomplished using a small library of anti-virus repair functions provided the host bytes can be located and restored. For simple, unencrypted viruses, table-based programs comprising entries for known viruses are usually sufficient. Each entry is associated with a repair routine that includes the storage locations of the host bytes in the virus and subroutines for restoring the host bytes to their proper location in the host file. Such table based methods work only with viruses that are identical in each instance of infection and employ standard infection strategies. The "Thunderbyte Anti-Virus" employs a repair system that steps through the viral code, one instruction at a time, evaluates each instruction, intercepts those instructions that appear likely to damage the computer system, and allows all other instructions to execute. This system is designed to allow the virus' own repair code to execute and restore the host bytes to their proper location in the host file.

New infection techniques and virus types have made these known repair systems increasingly unreliable. For example, once the Thunderbyte Anti-Virus system became known to virus designers, they devised ways to make their computer system-damaging instructions appear innocuous. Thunderbyte executes these seemingly innocuous instructions, facilitating infection of the system memory and files it was designed to protect. Table-based repair schemes are useless with polymorphic viruses, which employ complex encryption schemes to conceal a static virus body within a polymorphic decryption loop (PDL). The PDL appears different in each instance of infection, making the fixed repair routines of table-based repair schemes useless. When the host file is run, control passes to the polymorphic virus which decrypts itself until the static virus body is regenerated and then does its damage. As with most viruses, polymorphic viruses store overwritten host bytes and include virus repair routines that restore the saved host bytes and pass control to the host file once the viral code has run. With polymorphic viruses, however, the host bytes can not be accessed without first decrypting the PDL.

At least one polymorphic virus employs a new infection strategy in which control passing instruction packets are inserted in various locations throughout the host file rather than just at its entry point In this case, a series of overwritten host bytes must be located in the encrypted virus and restored to the host.

New repair schemes specifically designed to deal with polymorphic viruses include CPU emulators which allow the polymorphic virus to decrypt itself without exposing the computer's memory and files to infection by the virus. Once the virus is decrypted, its type is identified from its static virus body and the repair system tries to locate the host bytes and restore them to their proper location in the host file. These emulation based repair systems employ generic subroutines described above for repairing decrypted files, and at least one of these systems employs macros for identifying and dealing with viruses that deviate from the standard infection schemes. However, the macro language has only moderate functionality and is inadequate for repairing complex viruses.

SUMMARY OF THE INVENTION

The present invention is a system and method for repairing host files infected by a broad range of virus types employing a variety of infection strategies, without exposing unprotected memory and files to infection. The system (200) includes an emulator (210) that supports the full functionality of assembly language repair routines without limiting portability and without resorting to macro languages having limited functionality.

In accordance with the present invention, an emulation repair system (ERS) (200) comprises an emulation module (210), a foundation module (240), an overlay module (262), and a virus definition file (230). The emulation module (210) includes a control program (218) that creates a virtual machine (216) comprising a virtual processor (212) and a virtual memory (214). In addition, the control program (218) loads various modules into the virtual machine (216). The virtual machine (216) allows ERS (200) to step through selected instructions while isolating the computer system from the effects of these instructions. The virus-definition file (230) comprises an entry (232) for each known virus, which is used by the emulation module (210) to control decryption of those viruses that are encrypted. The foundation module (240) comprises a set of generic, machine language repair routines (242) that are useful for repairing host files (220) infected with common viruses (224). The overlay module (262) is a virus specific machine language program that is emulated within the virtual machine (216) to control restoration of the host file (220) once the infecting virus (224) has been decrypted. The overlay module (262) may restore the host file (220) through its own virus-specific (overlay) repair routine (262), the virus's repair routine (226), or any of the generic (foundation) repair routines (242).

When triggered by a virus detection program, the ERS (200) makes a backup copy (220') of the infected host file (220), locates the appropriate entry (232) for the virus (224) in the virus definition file (230), loads the infected host file into the virtual memory (host file image 220), and, if necessary, emulates infected host file image (220) until the virus (224) decrypts itself. The virus definition file entry (232) includes sufficient data to allow the emulation module (210) to determine when the static virus body of an encrypted virus (224) has been exposed. An interrupt table (248) allows emulation of interrupts called by the virus (224) during emulation without providing any actual links between the virtual machine 216 and the rest of the computer system (202).

Once virus decryption is complete, a repair phase begins. The overlay module (262) and foundation module (240), including a local interrupt vector table (250), are loaded into the virtual memory (216), and control of the virtual processor (216) is passed to the overlay module (262) designated in the virus entry (232). The local vector interrupt table (LIVT) (250) includes interrupts that can be called by programs within the virtual machine (216) to modify back-up file (220'). The rest of computer system (202) remains isolated from virtual machine (216) and its virus-infected image of host file (220) For unencrypted viruses, data fields (234) in the virus definition (232) indicate that no emulation is necessary. In this case, the overlay and foundation modules (262, 240) are loaded directly and control of the virtual processor (216) is passed to the overlay module (262).

Each overlay module (262) is written for a specific virus (224) and includes information for locating the host bytes (228) and, if necessary, the virus repair routine (226) in the virus (224). The overlay module (262) uses this information in conjunction with some combination of overlay, foundation, and virus repair routines (264, 242, 226), to restore the host bytes (228) to their proper locations (114) in the host file (220) and truncate the viral code (224) from the host file (220).

For example, the overlay module (262) associated with a standard virus (224) may pass control of the virtual processor (216) to one of the foundation repair routines (242), which then makes the necessary modifications to the host file (220). An overlay module (262) associated with a virus (224) that employs a non-standard infection strategy may include an overlay repair routine (264) designed specifically for the virus (224) or it may coopt the virus repair routine (226) to restore the host file (220). In the latter case, the virus repair routine (226) is first modified, using overlay or foundation routines (264, 242) as necessary, to return control of the virtual processor (216) to the overlay module (262) following repair. Control of the virtual processor (212) is then passed to the modified virus repair routine (226), which restores the host bytes (228) to their proper location (114) in the host file (220) and returns control to the overlay module (262).

Depending on the virus type and the repair strategy, the overlay module (262) may repair the back up file (220') of the host file (220) directly, repair the backup and image host files (220', 220") simultaneously, or repair the image host file (220") and subsequently over-write the back-up file (220') with the repaired code.

DETAILED DESCRIPTION OF THE PREFERRED EMBODIMENTS

In order to accomplish the mischief for which they are designed, software viruses must gain control of a computer's central processing unit (CPU). Viruses typically do this by attaching themselves to an executable file (host file) and modifying the executable image of the host file at its entry point to pass control of the CPU to the viral code. The virus conceals its presence by passing control back to the host file after it has run. Typically, the virus does this by restoring the instructions at the host file's entry point that the virus modified when it infected the host file, and passing control back to these instructions. Restoration occurs only in the executable image of the host file, not in the copy of the infected host file stored on disk. In DOS based systems, where the bulk of the software viruses have been found, the executable files are command (COM) files, executable (EXE) files, and system (SYS) files.

Figure 1A:
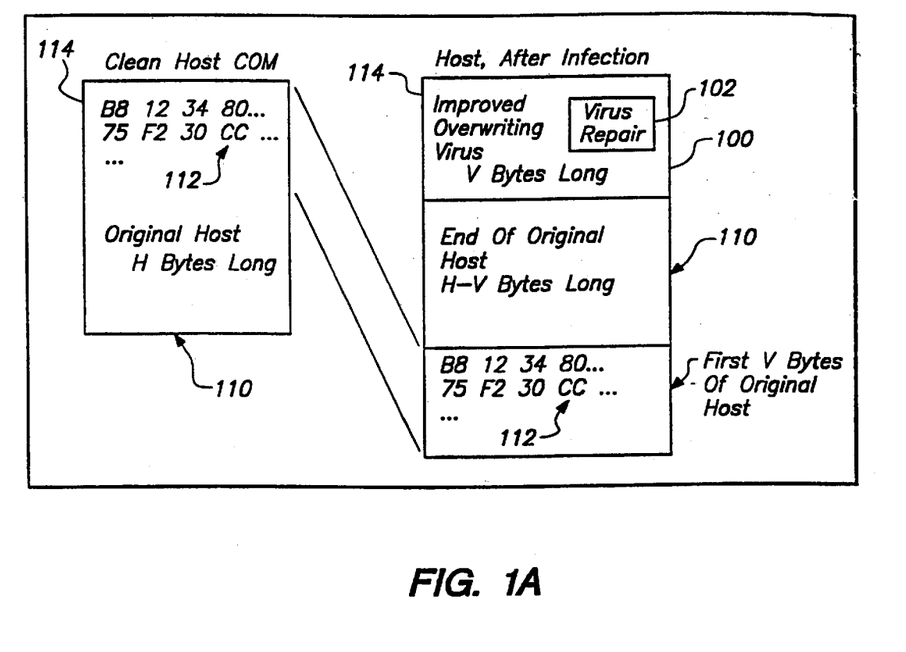
FIGS. 1A–1C are block diagrams of COM, EXE, and SYS files before and after infection by a virus.

Referring to FIG. 1A, there are shown block diagrams of a COM file 110 before and after infection by a virus 100. Code segment (host bytes) 112 of COM file 110 includes instructions at and adjacent to entry point 114 of COM file 110. In one common infection strategy, virus 100 inserts itself over host bytes 112 and copies overwritten host bytes 112 to the end of COM file 110. This strategy insures that virus 100 will run when COM file 110 is executed, while saving host bytes 112 to run COM file 110 when virus 100 has completed. Control is typically transferred back to COM file 110 by including repair code (virus repair routine) 102 in virus 100 that restores host bytes 112 to their original location and passing control of the processor to the first instruction of restored host bytes 112.

COM file 110 may also be infected by a number of other strategies. For example, virus 100 may be prepended to COM file 110 so that host bytes 112 follows virus 100. Alternatively, virus 100 may append itself to COM file 110, overwrite host bytes 112 at entry point 114 with a JMP statement to its address following COM file 110, and save overwritten host bytes 112 for running COM file 110 after virus 100 has run.

Figure 1B:
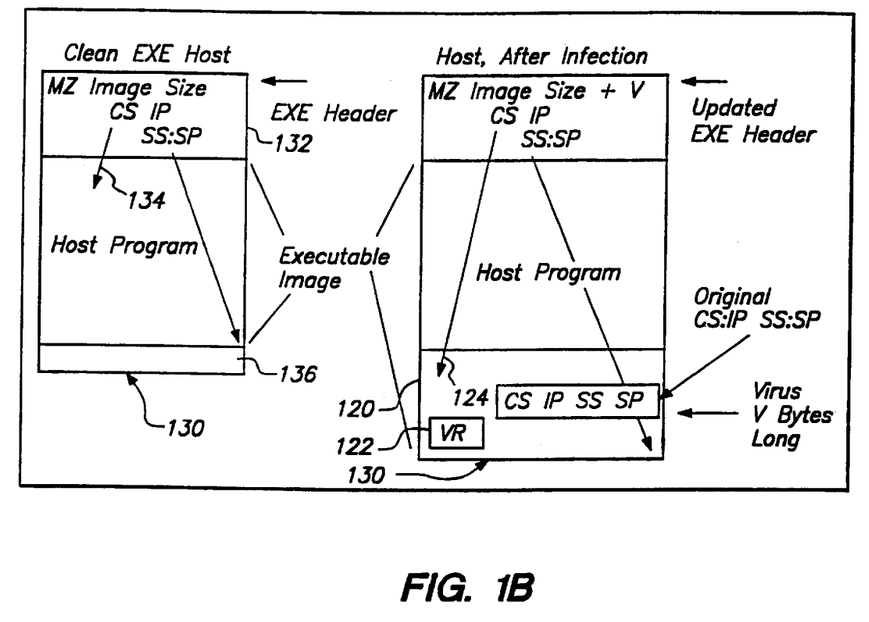

Referring now to FIG. 1B, there are shown block diagrams of an EXE file 130 before and after infection by a virus 120. EXE file 130 comprises a header 132 that includes basic information on the file. For example, CS:IP (host bytes 132) is a pointer to an entry point 134 to the body of EXE file 130 and SS:SP (host bytes 134) is a pointer to a stack 136 associated with EXE file 130. On infection, virus 120 appends itself to EXE file 130, replaces CS:IP with a pointer CS':IP' to its own entry point 124, replaces SS:SP with a pointer SS':SP' to a new stack location 136, and saved pointers CS:IP and SS:SP (host bytes 132, 134) so that EXE file 130 may be run following virus 120.

Figure 1C:
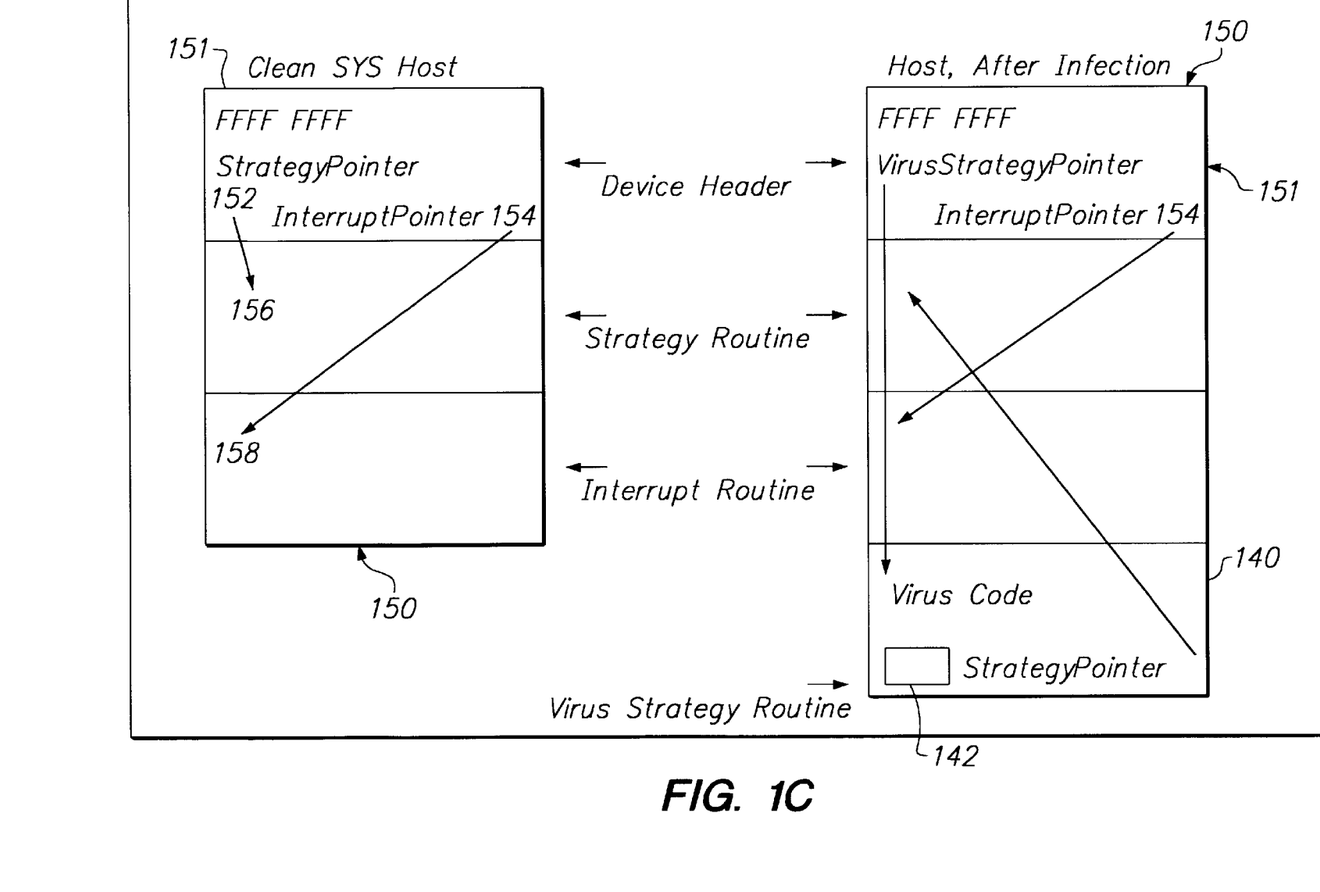

Referring now to FIG. 1C, there are shown block diagrams of a SYS file 150 before and after infection with a virus 140. A SYS file header 151 includes a strategy pointer 152 and an interrupt pointer 154 (host bytes 152, 154, respectively) that point to different entry points 156, 158, respectively of SYS file 150. On infection, virus 140 appends itself to SYS file 150, replaces host bytes 152 with virus strategy pointer 142, and saves SYS file host bytes 152 for accessing SYS file 150 after virus 140 has run.

The scenarios shown in FIGS. 1A–1C represent some but not all of the common strategies employed by various viruses 100, 120, 140 for infecting COM, EXE, and SYS files 110, 130, 150, respectively. These and additional infections strategies are discussed in greater detail in Nachenberg, *A New Technique For Detecting Polymorphic Computer Viruses*, Master Thesis, UCLA (1995), which is hereby incorporated by reference in its entirety.

In each infection strategy, it can be seen that the infecting virus modifies the host file at its entry point to gain control of the processor and stores any host bytes that it modifies so the host file can be run after the infecting virus has finished. In order to repair infected files 110, 130, 150, a file repair system must be able to locate host bytes 112, 132, 134, 152 in the virus, copy them to their proper location in the file, and truncate the virus from the host file. These repairs will only work if they are reflected to the back-up file that is stored on the computer disc, since the image of the host file in the virtual machine is not typically written back to the disc.

As noted above, this process is complicated by the growing use of encrypted viruses, such as polymorphic viruses, which have a different appearance in each instance of infection. In addition, new and more complex infection strategies have been developed for viruses. For example, the OneHalf polymorphic virus disperses control passing instructions to different locations throughout the body of the host file. Consequently, repair routines can not rely on control being passed directly to the virus, and multiple host bytes from locations throughout the host file must be found and restored to their proper locations in order to repair the host file.

Figure 2:
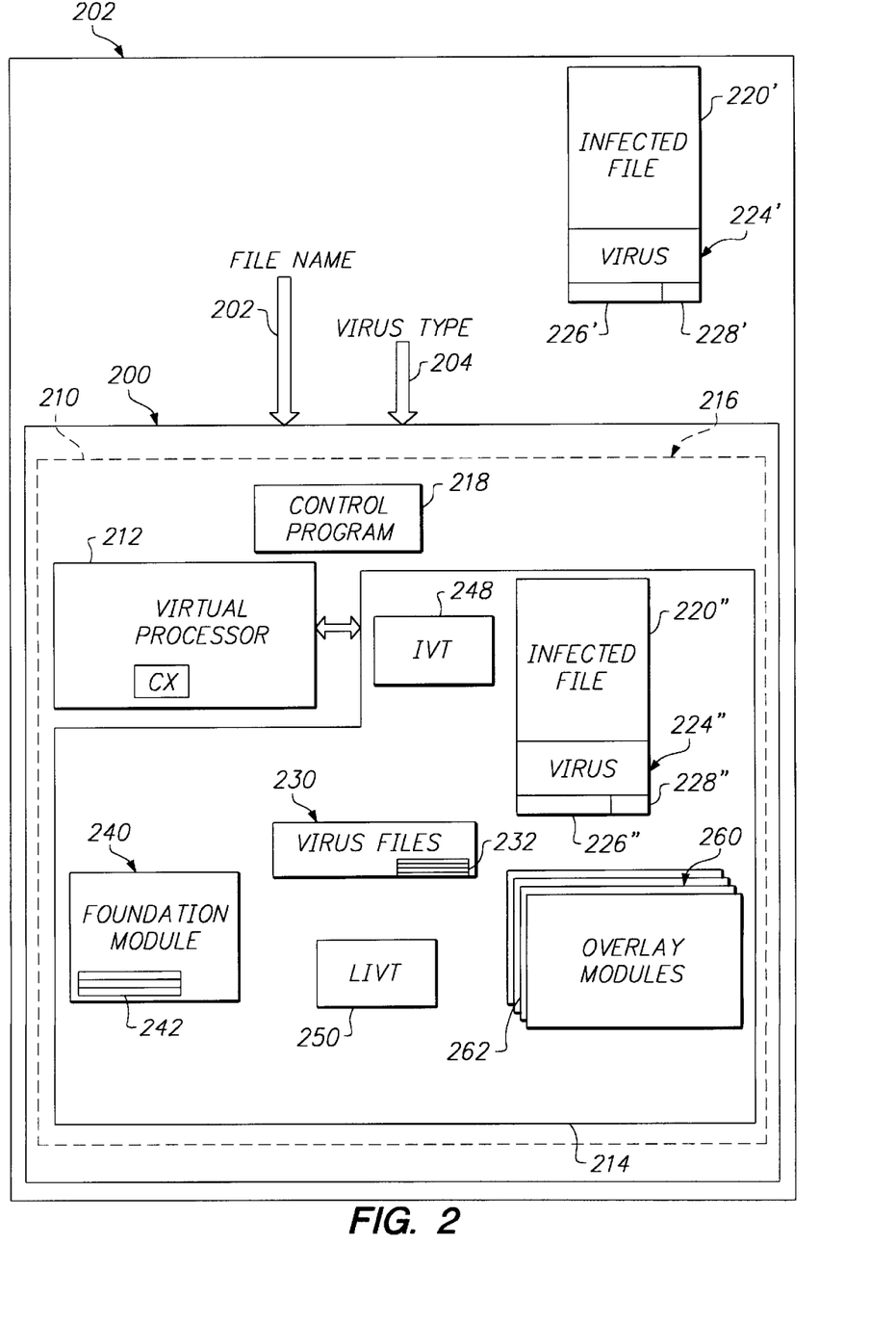
FIG. 2 is a block diagram of an Emulation Repair System in accordance with the present invention.

Referring now to FIG. 2, there is shown a block diagram of an emulation repair system 200 in accordance with the present invention. ERS 200 comprises an emulation module 210, a virus definition file 230, a foundation module 240, a local interrupt vector table (LIVT) 250, and overlay modules 260. Emulation module 210 includes a control program 218 for setting up a virtual machine 216 comprising virtual processor 212 and an associated virtual memory 214. Virtual machine 216 executes code in isolation from the remainder of a computer system 202 that includes ERS 200. An interrupt vector table (IVT) 248 supports interrupt calls from files being emulated by virtual processor 212, without actually linking virtual machine 216 and computer system 202. Virtual processor 212, IVT 248, and virtual memory 214 together form a virtual machine 216.

Foundation module 240 comprises generic (foundation) repair routines 242 suitable for use in restoring host files that have been infected by one of the standard infection strategies. Foundation repair routines 242 are accessed through LIVT 250, which comprises pointers to foundation repair routines 242. Foundation module 240, including LIVT 250, is activated only when ERS 200 enters its repair phase, as discussed below.

Also shown is an executable image of a host file 220" infected with a virus 224". Virus 224" is shown including a virus repair routine 226 and stored host bytes 228. Computer system 202 includes a back-up copy 220' of host file 220", which is generated by ERS 200 before repairs begin. Host file 220" and virus 224", including virus repair routine 226" and host bytes 228", are indicated by single and double-primed reference numbers when the copies in virtual machine 216 and computer system 202, respectively, must be distinguished. Unprimed reference numbers are used when the discussion applies to either copy.

Inputs 202, 204 provide ERS 200 with the name of infected host file 220 and the type of virus 224. This information may be provided, for example, by any of a number of virus detection modules, such as the polymorphic anti-virus detection module disclosed in the related application that is incorporated by reference. Table 1 is a memory map of ERS 200, showing the location of its component modules. As discussed in detail below, overlay and foundation modules 260, 240 are only loaded into virtual machine 216 after virus 224 has been decrypted.

TABLE 1

| COMPONENT | DESCRIPTION | ADDRESS RANGE |
| --- | --- | --- |
| IVT | Interrupt Vector Table for the virtual machine | 0000:0000–040:0000 |
| BDA | BIOS data area of virtual machine | 0040:0000–050:0000 |
| Support | Interrupt Handlers for Virus Scanning Program | 0050:000–07F0:0000 |
| PSP | Program Segment Prefix for the emulated program | 07F0:000–0080:0000 |
| Program Image | The infected program is loaded aod executed here | 0800:0000–A000:0000 |
| Unused | unused | A000:0000–F000:0000 |
| LIVT 250 | The Local Interrupt Vector Table occupies this region and comprises 256 WORD pointers. | F000:0000–F000:0200 |
| ERS, Foundation Module 240 | Generic repair subroutines | F000:0200–F000:8000 |
| ERS Overlay Module 260 | Routines for controlling repair of host file 220 | F000:8000–F000:FED0 |
| ERS Stack | local stack for foundation and overlay modules | -F000:FED0- |
| Emulation Register Values | EAX (DWORD) | FOO:FED0 |
|  | EBX (DWORD) | FOO:FED4 |
|  | ECX (DWORD) | FOO:FED8 |
|  | EDX (DWORD) | FOO:FEDC |
|  | ESI (DWORD) | FOO:FEE0 |
|  | EDJ (DWORD) | FOO:FEE4 |

TABLE 1-continued

| COMPONENT | DESCRIPTION | ADDRESS RANGE |
|---|---|---|
| | EBP (DWORD) | FOO:FEE8 |
| | ESP (DWORD) | FOO:FEEC |
| | CS (WORD) | FOO:FEF0 |
| | DS (WORD) | FOO:FEF2 |
| | ES (WORD) | FOO:FEF4 |
| | SS (WORD) | FOO:FEF6 |
| | RS (WORD) | FOO:FEF8 |
| | GS (WORD) | FOO:FEFA |
| | IP (WORD) | FOO:FEFC |
| | FLAGS (WORD) | FOO:FEFE |
| Top of Program | The first 256 bytes of the host program are stored here. | F000:FF00 |

In addition to foundation repair routines 242, foundation module 240 comprises data 244 required for common repairs. Foundation repair routines 242 and data 244 are likely be updated regularly to accommodate new virus strains and infection strategies. In order to facilitate these changes, foundation repair routines 242 are accessed through LIVT 250, since only the pointer in LIVT 250 need be changed when routines are modified, added or removed. In the disclosed embodiment, LIVT 250 comprises 256 interrupts, each of which points to an associated one of foundation repair routines 242. Overlay modules 260 may call any of foundation repair routines 242 using LIVT 250, and any of foundation repair routines may call other foundation repair routines, using LIVT 250.

Typical of foundation repair routines 242 is a checksummer to verify that the infecting virus has been correctly identified by the virus scanner and the virus repair routine is in its expected location within the virus. Foundation repair routines 242 also include subroutines for dealing with standard appended COM and EXE viruses, string searching subroutines, and subroutines for copying a specified number of bytes from a location in host file 220 in virtual machine 216 to a location of in back-up file 220'.

Two interrupts in LIVT 250 are reserved for special functions in ERS 200. Interrupt 21 provides the only link between virtual machine 216 and back-up file 220', and interrupt 3 is used for passing control of virtual processor 212 back to overlay module 260 from virus repair routine 226". Neither interrupt 21 nor any other interrupts of LIVT 250 provide links to any other part of computer system 202. This isolates the effects of virus 224" to back-up file 220'. Details of the use of interrupts 3 and 21 are discussed below.

Virus definition file 230 comprises an entry or virus definition 232 for each known virus. Each virus definition 232 contains information specific to a virus or a family of such viruses, including data necessary to decrypt virus, if it is encrypted, to its static virus body. ERS 200 uses the virus type at input 204 as an index to an appropriate virus definition 232 in virus definition file 230. Virus definition 232 includes an index to an associated overlay file 262 appropriate for virus 224. If virus 224 is unencrypted, control of virtual processor 212 is passed directly to associated overlay module 262.

Virus definition files 230 in accordance with the disclosed embodiment of the invention are organized as follows:

```
[RepairStart]; Virus-Name repair file
[VirusID]
0x2f41
[SigStart]
0x89, 0xb4, 0xb8, 0x02, 0x06, 0x56, DONE
[SigEnd]
[VirusExecutionCap]
1500000
[RepairExecutionCap]
1000
;[Flags]
;Strategy
[RepairFile]
VIRUSTYPE.DAT ; filename containing repair overlay
[RepairEnd]
```

Here, [VirusID] is a data field for a number that identifies the specific virus or virus strain that ERS 200 is being called upon to repair. [SigStart] and [SigEnd] bracket virus signatures, which are strings of bytes characteristic of the static virus body of virus 224. In the disclosed embodiment, these virus signatures are typically the first instructions executed in the static virus body following decryption, and often start with a CALL$ instruction (E8 00 00 in 80×86 processor architecture). The virus signatures specified in virus definition 232 are used by emulation module 210 to decrypt encrypted files, as discussed in greater detail below.

[VirusExecutionCap] specifies a maximum number of virus instructions necessary to fully decrypt the virus and reveal its static virus body. If more than this maximum number of instructions are emulated without detection of any of the specified virus signatures, the decryption phase of the process ceases and the repair phase commences.

[RepairExecutionCap] specifies the maximum number of instructions that overlay module 262, virus repair routine 226", and foundation module 240 should have to emulate in order to repair a host file 220 infected with the specified virus. If more than [RepairExecutionCap] instructions are emulated, an error message is returned to ERS 200, indicating an unsuccessful repair. This prevents overlay module 262, virus repair routine 226", and foundation module 240 from emulating instructions beyond the point where there is the possibility of repair.

[Flags] may be used to specify other parameters associated with a virus or host file type. For example, the flags "STRATEGY" and "INTERRUPT" are currently supported to indicate which entry point of an infected SYS file should be used for emulation.

[RepairFile] specifies the binary filename of associated overlay program 260 for the identified virus.

Virus definitions 232 of virus definition file 230 are used by emulation module 210 for decrypting virus 224" and for identifying the appropriate one of overlay modules 260 for restoring host file 220. Decrypting encrypted viruses is a necessary preliminary step in the repair process, especially when virus 224 is polymorphic. In these cases, the appearance of the polymorphic virus before and after decryption is very different, and the appearance of the same polymorphic virus is different in each instance of infection. On the other hand, the static virus body of the polymorphic virus does not vary from infection to infection, and provided it is a known virus, the location of the host bytes 228" and virus repair routine 226" in the static virus body will be known. In sum, decrypting encrypted viruses 224 is a necessary preliminary step for ensuring that the locations of host bytes 228" and virus repair routine 226" in virus 224" are properly identified.

Fortunately, all encrypted viruses, whether or not they are polymorphic, must decrypt themselves to reach their static virus bodies, and for this purpose, encrypted viruses include decryption routines which are typically run as soon as the virus gains control of the processor. The static virus body of virus 224 begins executing only after decryption is complete. The present invention emulates host file 220" in order to allow virus 224" to gain control of virtual processor 212 and decrypt itself.

The virus signatures specified in virus definition 232 are used by emulation module 210 to ensure that decryption has completed before overlay module 232 attempts to access host bytes 228 or virus repair routine 226. As execution of virus-infected host file 220" proceeds, instructions at the instruction pointer (IP) are compared to the virus signatures, and emulation is halted when a match occurs. Once a virus signature is reached by emulation module 210, an ordinal value assigned to the identified virus signature is stored in a virtual register CX, prior to transferring control of virtual processor 212 to overlay module 262. The contents of virtual register CX allows overlay module 262 to determine the strain of virus 224 when overlay module assumes control of virtual processor 212.

Once emulation of infected host file 220" ceases, whether because encrypted virus 224" has decrypted itself or was unencrypted to begin with, or because [VirusExecutionCap] limit has been reached, virtual register CX is updated with an indication of the virus signature. Control program 218 loads overlay module 262 and foundation module 240, including LIVT 250, into virtual memory 214, and passes control of virtual processor 212 to overlay module 262. By loading overlay and foundation modules 262, 240 only after virus 224" has been decrypted, ERS 200 limits the possibility that either module can be corrupted by virus 224" during decryption. Similarly, since only LIVT 250 includes interrupts for accessing back-up file 220' from virtual machine 216, loading LIVT 250 after emulation of virus 224" has ceased ensures that virus 224" can not access and damage the computer system 202 while it is being emulated.

In addition to loading the various modules into virtual memory 214 when virus 224" has been decrypted, ERS 200 updates registers associated with virtual processor 212 as follows:

1. ES:DI points to the CS:IP of the instruction that follows the last instruction emulated during the virus decryption phase. If virus 200 was not decrypted, ES:DI points to entry point 124 of infected host file 120.
2. DX:AX contains the file sized of infected host file 220.
3. CX contains a number associated with the virus signature found during decryption.
4. SS:SP points to a stack 266 area for use by overlay, foundation, and virus repair programs
5. FS:SI points to the initial CS:IP entry-point of infected host file 220.

With virus 224 fully decrypted and overlay module 262 in possession of information necessary to determine the state of virus 224, overlay module 262 can locate host bytes 228 and virus repair routine 226 as needed to restore host file 220 to its pre-infection state.

The actual content of overlay module 262 depends on the nature of virus 224, such as the complexity of virus repair routine 226 and the infection strategy employed by virus 224. For example, if virus 224 employs one of the standard infection strategies discussed earlier, it may be faster to repair infected host file 220 using one or more foundation repair routines 242. Alternatively, overlay module 260 may include its own overlay repair routine 264 for locating host bytes 228 in the virus and writing them back to their proper location in the host file, or it may use virus repair routine 226 to do this.

For more complex virus such as the OneHalf virus which disperses control transfer instructions at discontinuous locations throughout the host file 220, it would be very difficult to repair the host file using foundation repair routines 242. In this case, overlay module 262 includes code for locating and co-opting virus repair code 226". As noted above, overlay modules 260 that employ virus repair routine 226" to restore host file 220, modify virus repair routine 226" and LIVT 250 before passing control of the virtual processor 212 to virus 224". The modifications involve insertion of instructions following virus repair routine 226" that ensure control of emulation module 210 returns to overlay module 262 following repair.

Figure 3A:
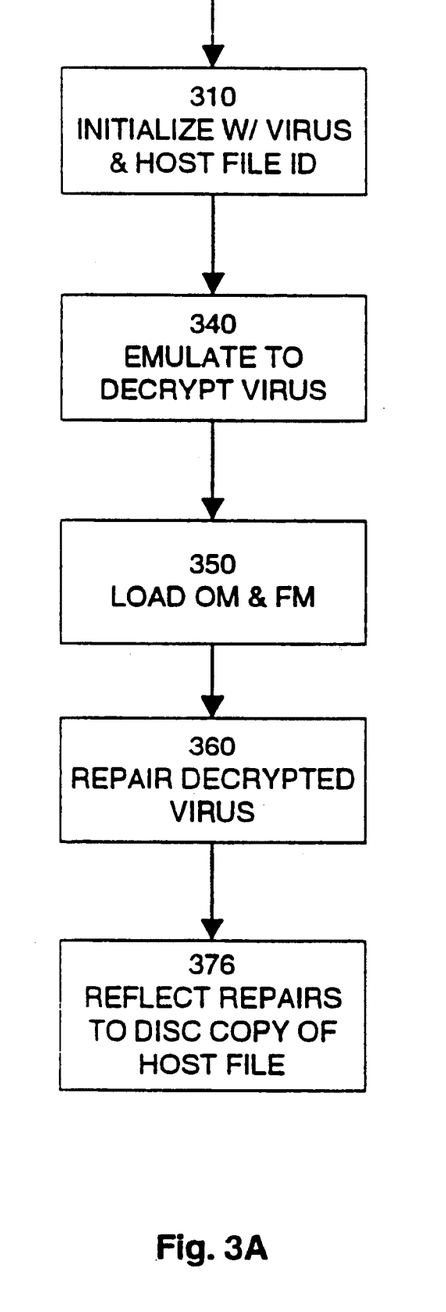
FIGS. 3A–3C are flow charts of a method employed by an emulation repair system for repairing an infected host file in accordance with the present invention.

Referring now to FIG. 3A, there is shown an overview of method 300 for repairing infected host file 220. Repair method 300 begins when ERS 200 is initialized 310 with data from a virus detection system (not shown). A virus-specific code provided by the virus detection system is used as an index to a virus definition 232 in virus definition file 230. As noted above, virus definition also includes information to access its associated overlay module 262. Virus 224" is then emulated 330, if necessary, until it is decrypted, using data in virus definition 232. Overlay and foundation modules 262, 240, respectively, are then loaded into virtual machine 216, and control of virtual processor 212 is passed 350 to overlay module 262. Overlay module 262 calls 360 overlay, foundation, and virus repair routines 264, 242, 226, as necessary, to effect repair of host file 220. No matter which of overlay, foundation, and virus repair routines 264, 242, 226, respectively, are employed by overlay module 262 to effect repairs, a repaired copy of host file 220 must eventually be copied to the disc. Overlay modules 260 use a number of different interrupts in order to effect repairs and reflect 380 them to the disc copy of host file 220.

At the outset of the repair phase, overlay and foundation modules 262, 240, respectively are loaded in virtual machine 216. Any repairs done to host file 220" under control of overlay module 262 must eventually be reflected to back-up copy 220' in order to eliminate virus 224' from computer system 202. Depending on the nature of virus 224 and the repair strategy implemented by overlay module 262, repairs may be reflected 380 to back-up file 220' in a number of different ways. In each case, communication between virtual machine 216 and the back-up file 220' in computer system 202 is accomplished using an interrupt reserved for this purpose. The functions implemented through the reserved interrupt, interrupt 21, are summarized in Table 2 and discussed in greater detail below:

TABLE 2

| FUNCTION | INPUT | OUTPUT |
| --- | --- | --- |
| Read Bytes From Host file 220 | AH: 3FH<br>DS:DX: Address of buffer to receive data<br>CX: Number of bytes to read | CF: Set on error, Clear success<br>AX: Number of bytes actually read |
| Write Bytes To Host File 220 | AH: 40H<br>DS:DX Address of buffer containing data to be written<br>CX: Number of bytes to write | CF: Set on error, clear on success<br>AX: Number of bytes actually written |
| Seek To Offset in Host File 220 | AH: 42H<br>CX:DX: Distance to mover file pointer (offset = CX*65536 + DX)<br>AL: Sub-function = move pointer to 0, 1, 2<br>o = start of file + CX:DX<br>1 = current position + CX:DX<br>2 = end of file + CX:DX | CF: Set on error, clear on success<br>DX:AX: New position of file read/write pointer |
| Terrminate ERS Repair | AH: FD<br>AL: Errorcode.<br>OFFH = error repairing<br>!OFFH = success repairing | None |
| Turn Write-Thru Mode On/Off | AH: FEH/FFH | None |

For example, overlay module 262 may retrieve host bytes 228" from decrypted virus 224" in virtual machine 216 and write them directly to back-up file 220' using INT 21 (AH=40H). Alternatively, overlay module 262 may effect all repairs to host file 220" in virtual machine 216 and subsequently write repaired host file 220" from virtual machine 216 over back-up file 220'. Finally, overlay module 262 may use INT 21 to turn on a "Write-Thru" mode (AH=FEH) prior to repairing host file 220" in virtual machine 216. Since host file 220" is memory mapped to back-up file 220', any changes made to host file 220" when "Writ-Thru" is activated will be reflected in back-up file 220' in computer system 202. This approach is particularly useful when overlay module 262 uses virus repair routine 226" to repair host file 220" because repairs made to host file 220" by virus repair routine 226" are simultaneously reflected to back-up file 220'. However, it may also be used to repair back-up file 220' where overlay module 262 simply writes host bytes 228" to host file 220" in virtual machine 216.

Another reserved interrupt, INT 3, is used by overlay module 262 when overlay module 262 employs virus repair routine 226" to repair infected host file 220". In this case, overlay module 262 uses INT 3 to ensure that virus repair routine 226" returns control of virtual processor 216 to overlay module 262 when repair has been completed. As noted above, overlay module typically turns on Write-Thru mode (INT 21, AH=FEH) before passing control of virtual processor 212 to modified virus repair routine 226", so that any changes made to host file 220" in virtual machine 216 are reflected to back-up file 220'.

Figure 3B:
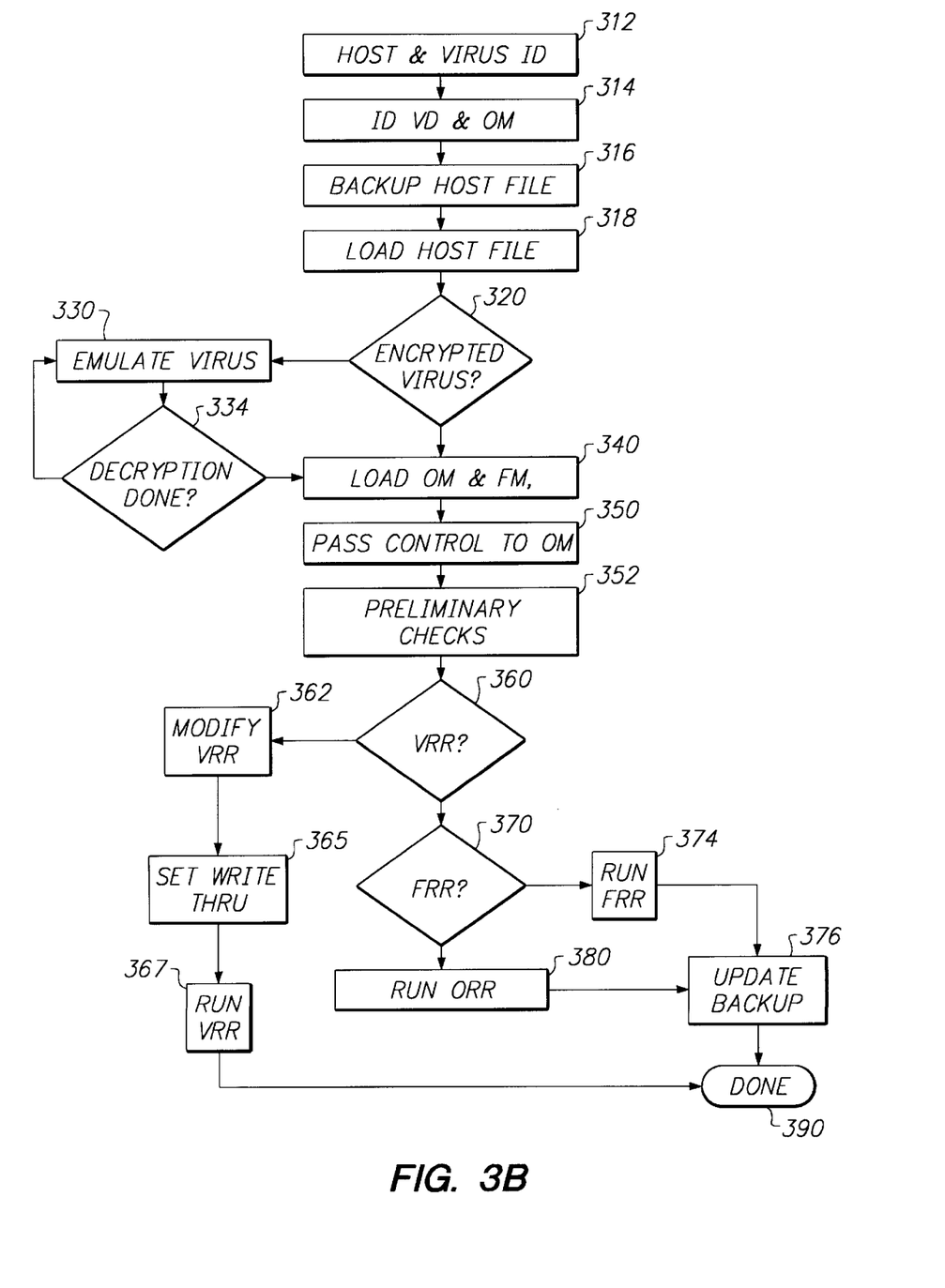

Referring now to FIG. 3B, there is shown a detailed flowchart of method 300 in accordance with the present invention. Initially, ERS 200 receives 312 data identifying infected host file 220 and the type of infecting virus 224. The virus data indexes 314 a virus definition (VD) 232 in virus definition file 230. Virus definition also includes a pointer to corresponding overlay module (OM) 262 so the correct one of overlay modules 260 may be loaded (step 349) when the decryption phase has completed. Before doing any emulation, ERS 200 creates 316 a backup copy of infected file 220 and loads 318 host file 220" into virtual memory 214.

Using virus definition 232, ERS 200 determines 320 whether virus 224 needs to be decrypted. If so, virus 224 is emulated 330 and its instructions at the instruction pointer (IP) of virtual processor 212 are compared 334 with the virus signatures specified in virus definition 232 at each point of the emulation. In the disclosed embodiment, 32 bytes beginning with the address at IP are compared with the virus signatures. When a virus signature is detected 334 among the bytes, the decryption phase is deemed completed and the repair phase begins. Overlay module 262 and foundation module 240, including LIVT 250, are loaded 340 into virtual machine 216, and control of virtual processor 216 is passed 350 to overlay module 262. If ERS determines 320 from virus definition 232 that virus 224 is not encrypted, ERS proceeds directly to load step 340.

Overlay module 232 comprises overlay repair routine 234 (ORR), which includes machine language code to run preliminary checks 352 on virus 224, such as confirming the identify of virus 224 and host file 220. Preliminary checks 352 may be done directly by overlay repair routine 264 or in combination with foundation repair routines (FRR) 242. If overlay module 262 is to use 360 virus repair routine (VRR) 226 to effect repairs on host file 220, overlay module 262 first modifies 362 virus repair routine 226 with an INT 3 instruction, as discussed below, sets Write thru mode on 366, and passes 268 control of virtual processor 212 to virus repair routine 226.

Figure 3C:
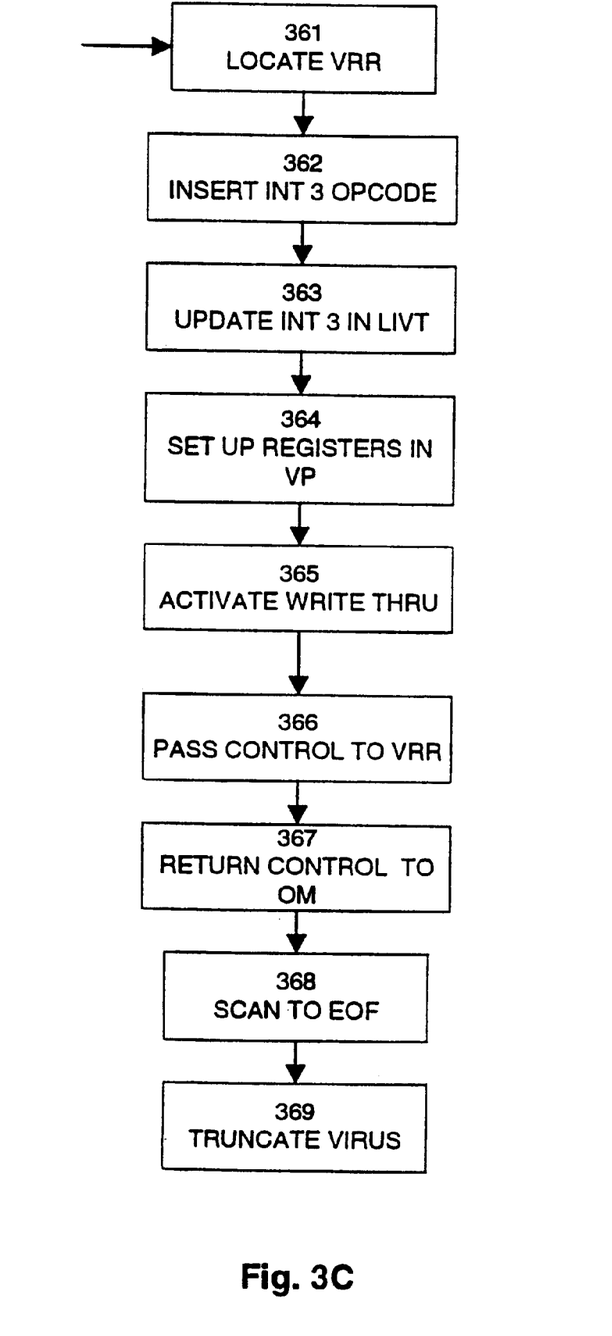

Referring now to FIG. 3C, there is shown a detailed flow chart steps 362, 367, 368 for repairing host file 220 with virus repair routine 226" and INT 3. First, overlay module 262 uses data on virus 224 to identify 361 the location of virus repair routine 226" in virus 224" and, in particular, to identify which instruction in virus 224 will be executed once virus repair routine 226 has been run. Overlay module 262 then writes 362 a CC opcode (INT 3) into virus 224" at the identified location, updates 363 INT 3 in LIVT 250 to point to an appropriate reentry point in overlay module 262, sets up 364 any registers in virtual machine 216 necessary for virus repair routine 226" to do its work, activates 365 "write-thru" mode, and transfers control 366 of virtual processor 216 to virus repair routine 226 using a PUSH/RETF or JMP FAR command. Virus repair code 226" will execute, repairing host file 220" and back-up file 220' simultaneously. When virus repair routine 226 reaches the INT 3, it will return 367 control to the indicated reentry point in overlay module 262, which scans 368 to the end of host file 220 and truncates 369 virus 224.

Returning again to FIG. 3B, an alternative repair strategy employed by selected overlay modules 260 uses 370 one or more of foundation repair routines 242 to restore host file 220. In the disclosed embodiment, the appropriate FRRs 242 are called 374 by overlay routine 264 and back-up file 220" is updated 376 using either the write (AH=40H) or write thru (AH=FEH) options of INT 21.

In certain overlay modules 262, overlay repair routine 264 may contain machine language sub-routines specific to associated virus 224 for repairing infected host file 220 without recourse to either virus repair routine 226" or foundation repair routines 242. In this case, overlay repair routine 264 is run 380 and back-up file 220' is updated 384 using the write (AH=40H) or "write-thru" (AH=FEH) options of INT 21.

Figure 4:
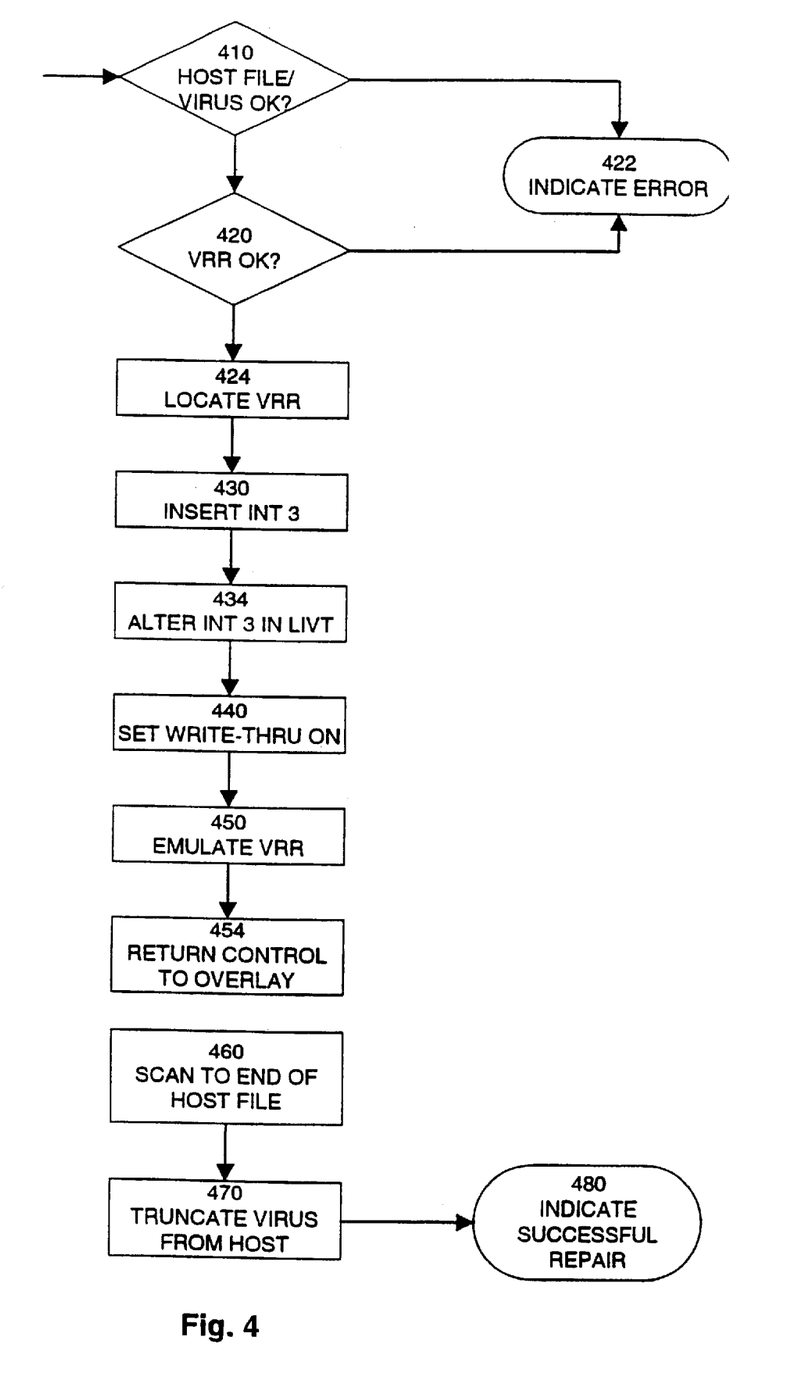
FIG. 4 is a flow chart of a method employed by overlay module for using repair code within a virus to repair an infected host file.

An example of an overlay module 260 that employs routines from all three sources is provided by overlay module 262 for the OneHalf virus. Referring now to FIG. 4, there is shown a flow chart of the method employed by overlay module 262 for implementing viral code to repair infected host file 220.

Initially, overlay module 260 confirms 410 that the type of infected host file 220 is consistent with the type of infecting virus. This check may be coded directly into overlay repair routine 264. For example, the OneHalf virus mentioned earlier only infects COM or EXE files. Consequently, if a virus scanner identified 312 a SYS file infected with the OneHalf virus, either the virus scanner has misidentified virus 224 or the wrong host file 220 has been identified to ERS 200. In either case, an error message is generated 422. Otherwise, overlay module 260 checks 420 that virus repair routine 226" is at the expected location in virus 220". Typically, this is done by applying a checksum routine to the code beginning at the location in question. The checksum routine may be part of overlay module 262 or it may be accessed from foundation module 240. If the checksum indicates 420 the code is not what was expected, an error message is generated 422. Otherwise, the repair process continues.

Having determined 420 that virus repair routine 226" is at its expected location in virus 224", overlay module 262 identifies 424 the instruction following virus repair routine 226 and inserts 430 an INT 3 instruction at this location. Overlay module 262 also alters 434 the entry in LIVT 250 associated with INT 3 to point to a reentry point 266 in overlay repair routine 264, activates 440 write-thru mode, and passes 444 control of virtual processor 212 to the instruction with which virus repair routine 226 begins. Virus repair routine 226 executes 450 in virtual machine 216 until the INT 3 instruction is reached, at which point control is transferred 450 to reentry point 266 in overlay module 262. When overlay module 262 regains 450 control of virtual processor 212 following virus repair routine 226, it uses INT 21 (AH=42H) to seek 460 to the end of host file 220, i.e. before appended virus 224, and truncates 470 virus 224.

It is noted that some polymorphic viruses 224 may encode parts of host file 220 as well as their own virus codes. In these cases, virus repair routine 226 typically includes code to decrypt host file 220, i.e. decryption of host file is implemented as part of the static virus body of virus 224. Consequently, host file decryption will be done during the repair phase of ERS 200 and poses no special problems for the system and method of the present invention.

There has thus been presented a system and method for repairing host files infected with a wide variety of virus types, including polymorphic viruses. The system includes an emulator that creates a virtual machine for executing host file, virus, and repair routine instructions in isolation from the rest of the computer system. During a decryption phase, encrypted viruses are emulated under the guidance of a virus definition, until the static virus body is reached. In the repair phase, a virus specific overlay module and a generic foundation module are loaded into the virtual machine, interrupts for communicating with the rest of the computer system are enabled, and control of the virtual machine is passed to the overlay module. The overlay module uses repair routines from the virus, foundation module, or overlay module, alone or in combination, to repair the virus-infected host file. Repairs made to the host file copy loaded in the virtual machine are reflected to the backup host file in the computer system using interrupts reserved especially for that purpose.

What is claimed is:

1. A system for forming a clean host file from a host file infected with a computer virus, the system comprising:

a repair module including a foundation module including generic repair routines and an overlay module including a virus-specific repair routine, the repair module for repairing the virus infected host file;

a control program for loading a copy of the virus infected host file and the repair module into a virtual machine and passing control of the virtual machine to the overlay module;

wherein, according to instructions in the overlay module, the repair module (a) locates host bytes in the copy of the virus infected host file, (b) restores the host bytes to proper locations within the copy of the file, and (c) removes code of the computer virus from the copy of the file to form the clean host file; and wherein the repair module is adapted to select between the virus-specific repair routine and the generic repair routines for repairing files infected by the computer virus.

2. The system of claim 1, wherein, before the repair module locates the host bytes, instructions from the copy of the file are emulated until a static virus body is decrypted.

3. The system of claim 1, wherein the repair module comprises instructions for locating a virus repair routine in the copy of the file and modifying the virus repair routine, and the virtual machine includes a local vector interrupt table which includes an interrupt for returning control of the virtual machine to the repair module after the virus repair routine has been emulated.

4. The system of claim 1, wherein the virtual machine includes a local vector interrupt table which includes a write-through routine for reflecting changes to the copy of the file from inside the virtual machine to a back-up file outside the virtual machine.

5. The system of claim 1, wherein the virtual machine includes a local vector interrupt table that provides interrupts which the repair module may implement in order to access and use generic repair routines from the foundation module, each generic repair routine being applicable to repair more than one virus.

6. The system of claim 5, wherein the generic repair routines of the foundation module include a checksum routine for verifying identification of the virus.

7. The system of claim 5, wherein the generic repair routines are adapted to be updatable.

8. The system of claim 5, wherein the generic repair routines of the foundation module include a routine accessible via a local interrupt for copying bytes at a first location inside the virtual machine to a second location outside the virtual machine.

9. The system of claim 1, further comprising a virus definition file, each entry in the virus definition file comprising a decryption-emulation-cap for specifying a maximum number of instructions to emulate when decrypting the virus.

10. The system of claim 1, further comprising a virus definition file, each entry in the virus definition file comprising a repair-emulation-cap for specifying a maximum number of instructions to emulate when repairing the virus.

11. A method for repairing a computer file infected with a virus using a virtual machine, a foundation module including generic repair routines, and an overlay module including a virus specific repair routine, the method comprising:

provide the virtual machine with decryption information on the infecting virus;

when the infecting virus is encrypted, emulating the infected computer file until the infecting virus decrypts itself;

loading the foundation and overlay modules into the virtual machine;

passing control of the virtual machine to the overlay module;

implementing repair routines from the overlay module, foundation module and the virus according to instructions in the overlay module, to repair the virus-infected computer file; and selecting between generic repair routines in the foundation module and virus-specific repair routines in both the overlay module and the virus.

12. The method of claim 11, wherein the implementing comprises:

locating the virus repair routine in the virus;

modifying the virus repair routine to return control to the overlay module when the virus repair routine has run; and passing control of the virtual processor to the virus repair routine.

13. A computer readable storage medium on which is stored data for repairing a virus-infected computer file using a virtual machine, a foundation module including generic repair routines, and an overlay module including a virus specific repair routine, the data being suitable for implementation by a processor to perform the steps of:

providing the virtual machine with decryption information on the infecting virus;

when the infecting virus is encrypted, emulating the infected computer file until the infecting virus decrypts itself;

loading the foundation and overlay modules into the virtual machine;

passing control of the virtual machine to the overlay module;

implementing repair routines from the overlay module, foundation module and the virus according to instructions in the overlay module, to repair the virus-infected computer file; and selecting between generic repair routines in the foundation module and virus-specific repair routines in both the overlay module and the virus.

14. A method for repairing a host file infected by a computer virus, the method using a virtual environment, a foundation module including generic repair routines, and an overlay module including virus specific repair routines, the method comprising:

emulating the host file in the virtual environment to allow a decryption loop of the virus to decrypt a body of the virus;

loading the foundation and overlay modules into the virtual environment;

passing control of the virtual environment to the overlay module;

identifying the virus with the overlay module;

selecting a particular repair routine with the overlay module from a group of repair routines comprising the virus-specific repair routines in the overlay module and the generic repair routines in the foundation module;

locating at least one host byte that was relocated during infection of the host file; and restoring the host byte to an original location in a virtual copy of the host file.

15. The method of claim 14, wherein emulating the virus continues until a virus signature is detected.

16. The method of claim 14, further comprising:

confirming identification of the virus after identifying the virus.

17. The method of claim 14, wherein a repair routine located in the virus is utilized for locating and restoring the host byte.

18. The method of claim 17, wherein an interrupt instruction of the virtual environment is used to transfer control away from the repair routine located in the virus.

19. The method of claim 14, wherein the virus-specific repair routines include a repair routine from the virus itself.

20. The method of claim 14, further comprising:

creating a real copy of the host file outside the virtual environment.

21. The method of claim 20, wherein an interrupt instruction in the virtual environment allows the real copy of the host file to be modified.

22. A computer readable storage medium on which is stored data for repairing a host file infected by a computer virus, the data using a virtual environment, a foundation module including generic repair routines, and an overlay module including virus specific repair routines, the data being suitable for implementation by a processor for performing the steps of:

emulating the host file in the virtual environment to allow a decryption loop of the virus to decrypt a body of the virus;

loading the foundation and overlay modules into the virtual environment;

passing control of the virtual environment to the overlay module;

identifying the virus with the overlay module;

selecting a particular repair routine with the overlay module from a group of repair routines comprising the virus-specific repair routines in the foundation module and the generic repair routines in the foundation module;

locating at least one host byte that was relocated during infection of the host file; and restoring the host byte to an original location in a virtual copy of the host file.

* * * * *